Jan. 19, 1971  W. RYMES  3,556,587
ROCKER SUPPORT FOR INFANT SEAT
Filed Oct. 1, 1968  3 Sheets-Sheet 2
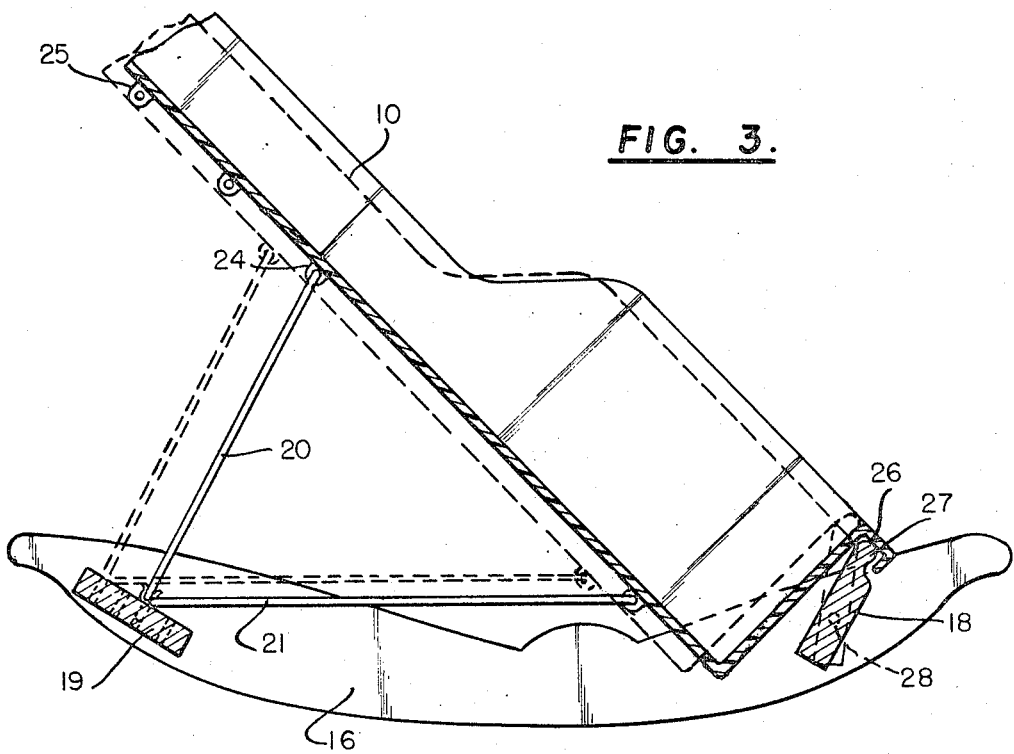
FIG. 3.
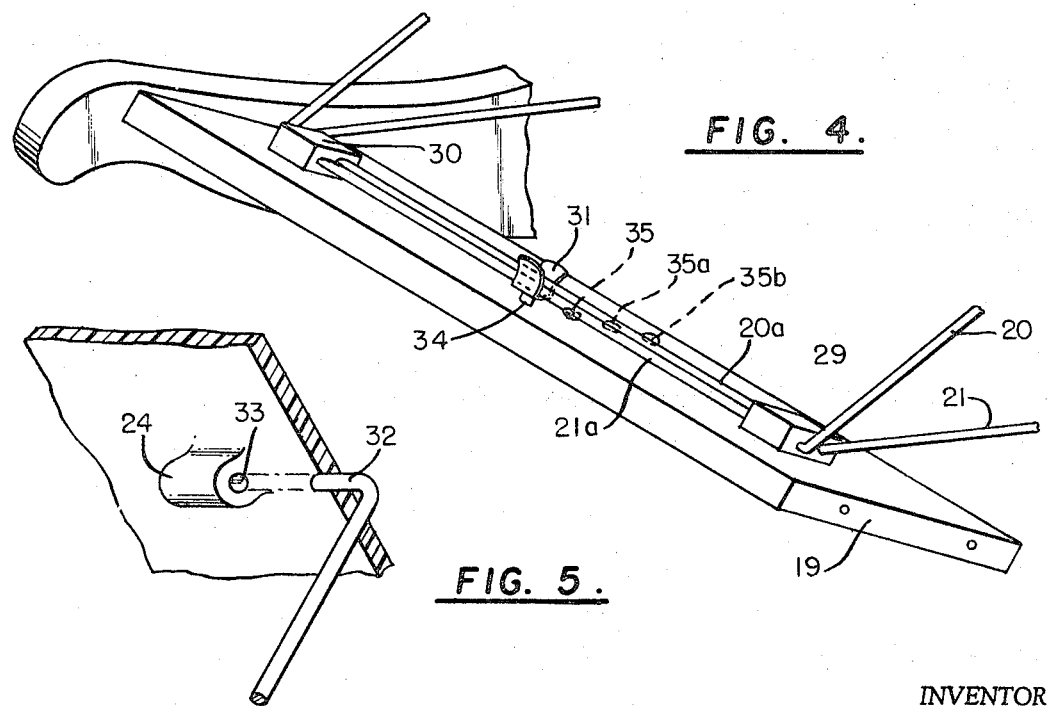
FIG. 4.
FIG. 5.
INVENTOR
William H. Rymes
BY Hall, Pollock & Vande Sande
ATTORNEY Jan. 19, 1971 W. RYMES 3,556,587
ROCKER SUPPORT FOR INFANT SEAT
Filed Oct. 1, 1968 3 Sheets-Sheet 3

INVENTOR
William H. Rymes

BY Hall, Pollack & Vande Sande

ATTORNEY

United States Patent Office 3,556,587
Patented Jan. 19, 1971

3,556,587
ROCKER SUPPORT FOR INFANT SEAT
William Rymes, Ossipee Mountain Road,
Center Ossipee, N.H. 03864
Filed Oct. 1, 1968, Ser. No. 764,070
Int. Cl. A47d 1/08, 13/02
U.S. Cl. 297—133          9 Claims

ABSTRACT OF THE DISCLOSURE

A rocker-type support for a portable infant seat of the type having an adjustable supporting means for supporting the seat upon a plane surface at various angles of inclination. The rocker support is detachably secured to the infant seat and provides an adjustable support therefor, permitting ready adjustment of the location of the center of gravity of the infant seat and rocker combination so as to permit continued balanced operation as the infant grows.

BACKGROUND OF THE INVENTION

In recent years, infant seats of the type into which a small infant can readily be placed and strapped therein and permitting ready carrying of the infant while in such seat, have been widely sold and have become considered to be highly useful and desirable by parents of infant children. Such an infant seat provides a comfortable support in which a small infant can play, sleep, and be fed, and also be readily carried about. Such infant seats are generally molded of plastic and are of light weight, being provided with adjustable straps so that an infant can readily be secured in the seat. Generally, an adjustable, foldable support for such seats is secured thereto, so that the seat can readily be supported upon a surface such as a table or the floor in any one of numerous positions, depending upon the adjustment made between the supporting bracket and the seat structure itself.

Although such infant seats have become highly popular, many parents have recognized that small children enjoy being rocked or swung to and fro, as this appears to amuse and pacify them. The infant seats now available have generally not been designed to permit use in this fashion, however, as they are intended only to be carried or to be supported solidly upon a table, floor, or the like.

Some attempts have been made to adapt such infant seats for use as rockers by providing that the seat supporting structure can be affixed thereto in such a manner that a curved portion thereof can be moved into position to provide a rocker support. The disadvantages of this type of construction is that such a rocker support is not sufficiently stable to ensure that the seat will not be tipped over by an active child. Moreover, such devices, although permitting adjustment of the inclination of the seat, do not readily provide for changing the position of the center of gravity, which is highly important, especially with a rocker, in order that the rocker with the child therein will be properly balanced, both for a very young infant, i.e. one only a few weeks old, and as well for a much larger infant up to an age of perhaps one and one-half years.

SUMMARY OF THE INVENTION

The present invention relates to a rocker support for an infant seat of the kind just described. The rocker support comprises a pair of rocker members which are preferably so contoured that the rocker cannot tip to the front or to the rear. Connected between the two curved rocker members are at least two supports, one of which is adapted to engage with and support the lower front edge of the infant seat, while the other is adapted to support the adjustable frame members which are secured to the rear of the seat and which ordinarily have the function of supporting the seat upon a solid surface such as a table. The seat is adjustable in position upon the rocker support, both by adjustment of the frame members in the usual way, and also by shifting the entire infant seat, together with its support members, either forward or aft along the rocker, so as to permit adjustment of its center of gravity with the result that the seat with the child therein will be properly balanced on the rocker over a very substantial range of child sizes and weights. To accomplish such adjustment, the rear seat support to which the support frame for the seat is detachably secured provides a plurality of such supports at different distances from the front of the rocker. The front and lower edge of the seat itself engages with the front seat support which is preferably freely adjustable in position as well in accordance with the positioning of the seat relative to the rear support.

BRIEF DESCRIPTION OF THE DRAWINGS

In describing the invention, reference will be made to the accompanying drawings, in which:

FIG. 3 is a detailed view of the preferred embodiment, illustrating the manner in which the seat support is secured to the rocker support;

FIG. 4 is a detailed view showing the rear rocker support and the manner in which the seat support may be secured thereto;

FIG. 5 is a detailed view of the means for adjustment of the seat-supporting frame to the seat;

DETAILED DESCRIPTION OF THE PREFERRED EMBODIMENT

Figure 1:
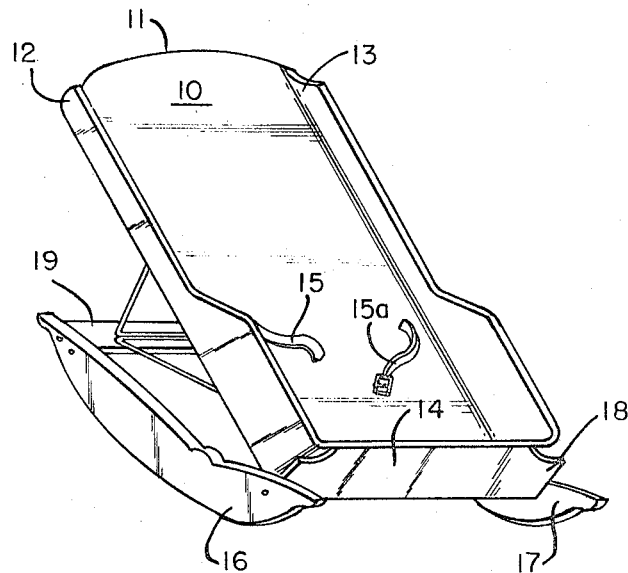
FIG. 1 is a front perspective view of the infant seat secured to the rocker support of this invention.

FIG. 1 illustrates a conventional infant seat 10, which comprises a back support 11, upstanding side walls 12 and 13, and a bottom wall 14. Straps 15 and 15a are provided so that an infant placed in the seat 10 can readily be secured thereto.

The infant seat 10 is shown in FIG. 1 as being supported upon a rocker comprising two side rocker members 16 and 17 which are joined at the front and rear by transverse front and rear supporting members 18 and 19, respectively.

Figure 2:
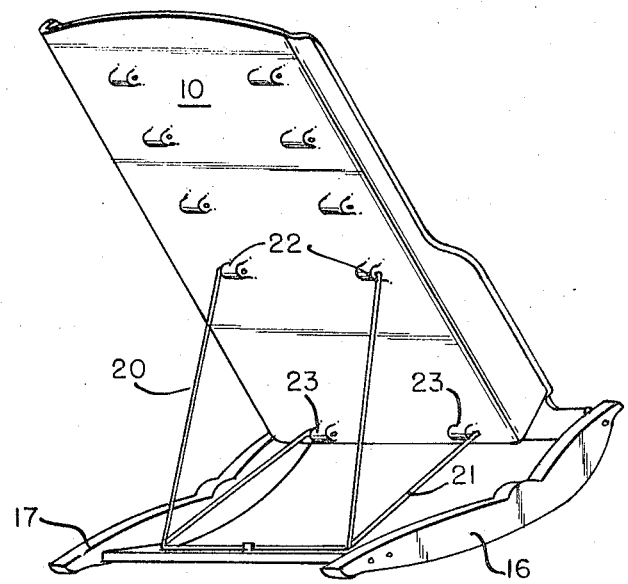
FIG. 2 is a rear perspective view of the embodiment of FIG. 1, particularly illustrating the attachment of the seat to the rocker support.

FIG. 2 shows a rear perspective view of the infant seat of FIG. 1 supported upon the rocker assembly of the present invention, and particularly illustrates the supporting frame comprising two generally U-shaped members 20 and 21, which serve to support the member 10 upon the rocker assembly. The two U-shaped members 20 and 21 are pivotally joined at their respective bight portions, and the member 20 has the ends of its respective leg portions inserted into integrally molded apertured bosses 22, which are provided in pairs upon the rear outer surface of the member 10 so that a selected pair can be chosen dependent upon the desired degree of inclination of the member 10 upon the rocker support. The U-shaped member 21 similarly has its leg portions secured within apertured bosses 23 also integrally formed with the rear outer surface of member 10.

FIG. 3 is a side cross-sectional view of the combination of FIGS. 1 and 2, illustrating particularly the front and rear seat supports 18 and 19. FIG. 3 particularly illustrates the manner in which the inclination of the seat may readily be altered by shifting the position of the U-shaped seat support member 20. Thus, when member 20 is in the position shown in FIG. 3, with the ends of member 20 inserted in a lower pair of apertures 24, the seat is in a fairly upright position; however, when the free ends of member 20 are moved from this position and inserted instead in the topmost pair of apertures 25, the member 20 will assume a much more inclined position, as shown in dotted lines.

Figure 6:
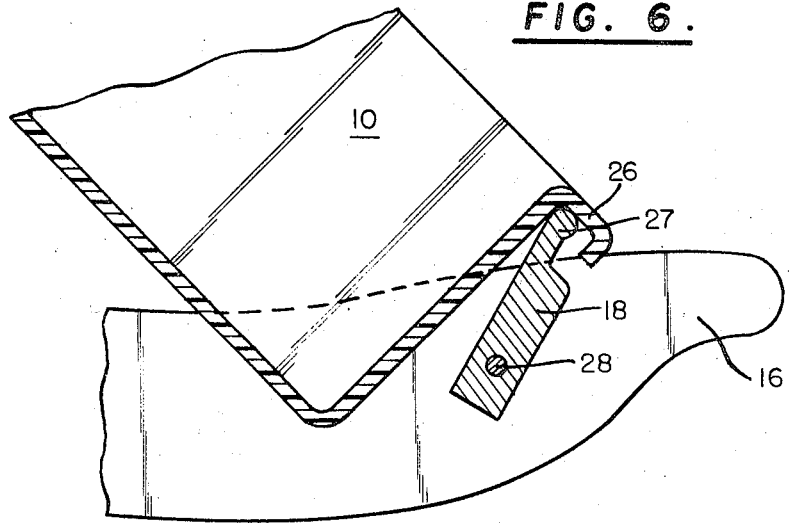
FIG. 6 illustrates in cross-section the manner in which the infant seat is supported by the front seat support.

FIGS. 3 and 6 show that the lower front edge of the member 10 has a vent-over lip portion 26 so as to provide a rounded edge which will be comfortable to an infant in the seat when it becomes of such a size that its legs and feet hang over the front edge of the seat. The curved-over edge 26 effectively defines a recess in member 10 for receiving the uppermost edge 27 of front seat support 18, thereby increasing greatly the lateral stability of the seat 10 upon the rocker support.

When the seat member 10 is rotated downwardly to a more nearly horizontal position than is shown in FIG. 3, by means of attaching the free ends of seat support frame 20 to a pair of apertured bosses located higher up on the back of seat member 10, front support 18 rotates counterclockwise about a pivot 28, which may comprise a screw or the like that passes through the rocker member 16 and into the side of front seat support 18. Thus, because of the pivotal support of the front seat support 18, the member 10 remains fully supported by both this member 18 and by the seat support frames 20 and 21, irrespective of how these are adjusted to suit the desired angle of inclination of seat 10.

FIG. 4 illustrates the manner in which the seat support frames 20 and 21 may be secured to the rear seat support 19. Thus, the support frames 20 and 21 are pivotally secured together by means of apertured blocks 29 and 30. Each member 20 and 21 is freely rotatable within the respective blocks 29 and 30, so that each may be rotated relative to the other as desired. Thus, the bight portions 20a and 21a, respectively, remain adjacent each other, even though the positions of these members 20 and 21 may be adjusted angularly as desired. Supported by the rear seat support 19 is provided by at least one spring clip 31 of known type into which either member 20a or 21a may be inserted with a snap-fit, in such manner that the pivot point of the members 20 and 21 at the rear of the seat and rocker combination is pivoted for adjustment. This spring clip 31 may be secured to a threaded stud 34 which can be threaded into any one of several spaced, threaded apertures 35, 35a, 35b formed in a rear support 19.

FIG. 5 is a detailed view showing the manner in which the leg portion of each of the seat support frames 20 and 21 is secured within a protruding boss, such as the boss 24. Thus, each leg portion of one of the U-shaped members 20 and 21 is provided with a bent-over portion 32 which is parallel to the axis of rocking of the seat member 10, and thus adapted to fit in the aperture 33 formed in boss 24.

The pivoting of the front seat support 18 is, as previously explained, desirable in order to accommodate tilting of the seat. Such pivoting feature is of equal or greater significance, however, in permitting adjustment of the center of gravity of the rocker. Thus, it will be apparent that a very small infant, when placed in the seat, will provide a very different center of gravity for the seat-rocker combination than will a substantially taller infant of greater weight, whose legs may ordinarily dangle over the front edge. This presents no particular problem when the seat is used only as a seat, but does present a distinct problem when the seat is to be affixed to the rocker of the present invention since otherwise a particular configuration which is suitable for an infant of one size might result in the rocker's being rotated entirely too far forward, or too far back, to be of any practical use for an infant of significantly different size. To avoid this, the present invention permits the ready adjustment of the center of gravity so as to accommodate the device to such changing circumstances. Thus, FIG. 4 illustrates a spring clip 31 which fits in a particular one of the plurality of apertures 35, 35a, 35b provided in the rear seat support 19. When it is desired to alter the center of gravity, this can readily be done by shifting the position of the spring clip 31 to a different one of the apertures 35, 35a, or 35b. Such shifting of the spring clip 31 to a more forward position, of course, moves the entire seat 10 forwardly relative to the rocker, as indicated by the dotted lines of FIG. 3. Such forward movement can readily be accommodated by the structure disclosed herein by reason of the fact that the forward seat support 18 is pivotable about the pivot point 28.

Figure 7:
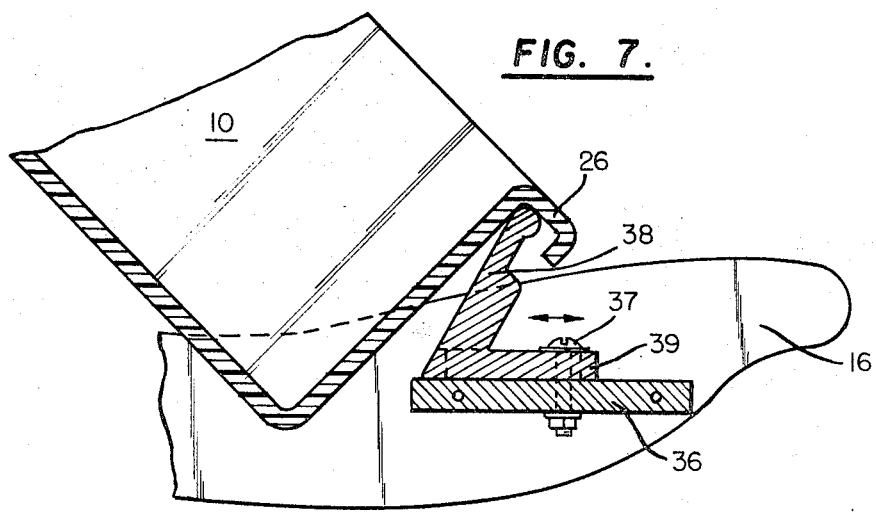
FIG. 7 illustrates an alternative form of front seat support.

FIG. 7 illustrates an alternative embodiment for permitting adjustment of the front seat support when it is desired to change the pivotal inclination of the seat member 10 or to move it fore or aft. Thus, in FIG. 7, the member 36 is secured in position relative to the rocker member 16. However, secured to the member 36 by means of one or more bolts 37, is an angle-shaped member 38 having an upstanding portion 38a, which is adapted to fit within the curved-over lip 26 of member 10. Member 36 is provided with a round aperture to receive bolt 37, but member 38 is provided with an elongate slot 39, thereby permitting the entire member 38, 38a, to be shifted to the front or rear, as desired, dependent upon the positioning of the seat support brackets 20 and 21 relative to the rear seat support 19.

Figure 8:
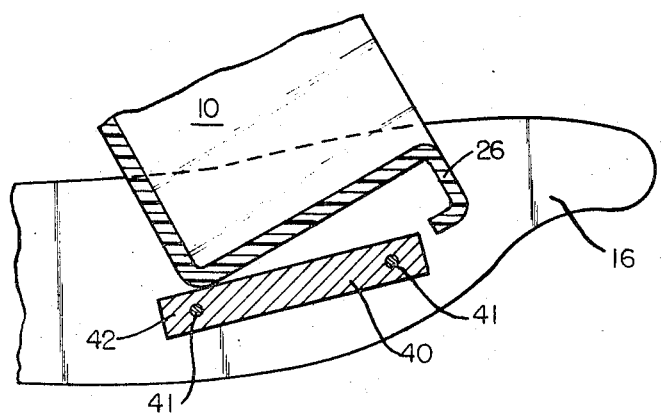
FIG. 8 illustrates a still different alternative embodiment of the front seat support.

Although the embodiments just described are the preferred embodiments, it should be understood that it is possible to simplify the construction somewhat, by providing a front seat support which is not adjustable. Such embodiments is illustrated in FIG. 8, which shows a front seat support 40 that is fixed in position relative to the rocker member 16 by means of screws 41 which pass through the rocker member 16 and into the ends of support 40. In this event, the curled-over lip portion 26 of seat member 10 cannot be ordinarily arranged so as to fit snugly over the front edge of member 40; instead, member 10 then merely rests upon the member 40 at its rear point 42.

It can be seen in FIG. 3 that the rocker members 16 and 17 have a portion of their lower edges near the front and rear extremities which is of concave curvature. This guards against tipping of the rocker and also lessens the possibility of pinching of the fingers of an infant.

The invention has been described particularly for use as a rocker support for an infant seat. It will be readily apparent, however, that the rocker support can readily be adapted for use to support a seat which is particularly designed to carry a child's doll, for example.

What I claim is:

1. In combination,
   a generally tray-shaped portable infant carrying means and an adjustable frame support secured to said carrying means and adapted to support said carying means at a selected angle on a plane surface,
   a rocker support for said carrying means,
   said rocker support comprising a pair of curved rocker members,
   transverse front and rear seat supports for said carrying means connected between said rocker supports,
   one of said transverse supports being fixed and the other movable fore and aft,
   means for detachably securing said frame to said rear support,
   said front seat support providing support for the lower end of said carrying means.

2. The combination of claim 1 in which said securing means is adapted to permit the securing of said frame adjustably fore and aft to said rear support and said front support is movable fore and aft.

3. The combination of claim 2 in which said front seat support removably fits into a recess defined in said carrying means.

4. The combination of claim 2 in which said rear support has mounted thereon at least one spring clip for frictionally engaging said frame.

5. The combination of claim 2 in which said front support is pivotable fore and aft about an axis parallel to the axis about which said rocker members rock.

6. The combination of claim 2 in which said front support includes a first fixed member and a second member which is slidable fore and aft relative to said first member, said second member being removably engageable with said carrying means.

7. In combination with an infant carrying and supporting means of the kind comprising a generally oblong bottom member having upstanding side and bottom edges together with an adjustable supporting frame comprising first and second resilient U-shaped frame members and means joining said two frame members at their respective bight portions but permitting rotation of said two members relative to each other, said free legs of each frame member being rotatably coupled with the rear face of said bottom member at spaced locations to thereby provide a triangular support for said oblong member permitting it to be supported at an angle on a plane surface, the improvement which comprises:

a rocker support comprising,
two curved rocker members,
front and rear transverse supports joining said rocker members,
means for detachably coupling said oblong member adjacent its bottom edge to said front support,
means for coupling said two frame members adjacent their joined bight portions adjustably to said rear support in a manner to permit fore and aft adjustment of said frame members relative to said rear support,
said front support being adjustable fore and aft.

8. The improvement as defined in claim 7 in which said front support is rotatable about a transverse pivot and the pivoting edge of said support detachably couples to said oblong member.

9. The improvement as defined in claim 7 in which said front support is slidable fore and aft.

References Cited
UNITED STATES PATENTS

| | | | |
|---|---|---|---|
| 2,662,581 | 12/1953 | Gottfried | 297—133 |
| 3,101,972 | 8/1963 | Laughlin | 297—377 |

REINALDO P. MACHADO, Primary Examiner

U.S. Cl. X.R.

297—377